(12) United States Patent
Oku

(10) Patent No.: US 8,492,997 B2
(45) Date of Patent: Jul. 23, 2013

(54) DRIVING CIRCUIT OF LIGHT-EMITTING ELEMENT AND METHOD OF GENERATING DRIVING SIGNAL THEREFOR

(75) Inventor: Hideki Oku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 13/087,641

(22) Filed: Apr. 15, 2011

(65) Prior Publication Data

US 2011/0273106 A1  Nov. 10, 2011

(30) Foreign Application Priority Data

May 7, 2010 (JP) ................................. 2010-107509

(51) Int. Cl.
*G05F 1/00* (2006.01)
*H05B 37/02* (2006.01)
*H05B 39/04* (2006.01)
*H05B 41/36* (2006.01)
*G06F 1/04* (2006.01)

(52) U.S. Cl.
USPC .......................................... 315/297; 327/291

(58) Field of Classification Search
USPC .......................................... 315/297; 327/291
See application file for complete search history.

(56) References Cited

U.S. PATENT DOCUMENTS

| 6,774,937 | B1 * | 8/2004 | Kobayashi | 348/222.1 |
| 7,106,386 | B2 * | 9/2006 | Kobayashi | 348/625 |
| 7,453,303 | B2 * | 11/2008 | Cebry et al. | 327/291 |
| 7,812,587 | B2 | 10/2010 | Suzuki et al. | |
| 2008/0266283 | A1 | 10/2008 | Suzuki et al. | |

FOREIGN PATENT DOCUMENTS

| JP | 01-179194 | 7/1989 |
| JP | 2006-40974 | 2/2006 |
| JP | 2006-40975 | 2/2006 |
| JP | 2009-277514 | 11/2009 |

* cited by examiner

*Primary Examiner* — Shawki Ismail
*Assistant Examiner* — Dylan White
(74) *Attorney, Agent, or Firm* — Fujitsu Patent Center

(57) ABSTRACT

A driving circuit includes a first delay circuit, a rise-detection circuit, a fall-detection circuit, a first filter, a second filter, and an adder. The first delay circuit delays an input signal. The rise-detection circuit detects a rise of the input signal. The fall-detection circuit detects a fall of the input signal. The first filter gives a first gain-frequency response to an output signal of the rise-detection circuit. The second filter gives a second gain-frequency response to an output signal of the fall-detection circuit. The adder adds an output signal of the first filter and an output signal of the second filter to an output signal of the first delay circuit.

13 Claims, 17 Drawing Sheets

OPTICAL OUTPUT WAVEFORM (1 PULSE)

US 8,492,997 B2

DRIVING CIRCUIT OF LIGHT-EMITTING ELEMENT AND METHOD OF GENERATING DRIVING SIGNAL THEREFOR

CROSS-REFERENCE TO RELATED APPLICATIONS

This application is based upon and claims the benefit of priority of the prior Japanese Patent Application No. 2010-107509, filed on May 7, 2010, the entire contents of which are incorporated herein by reference.

FIELD

Embodiments discussed herein relate to a driving circuit of a light-emitting element and a method of generating a driving signal therefor.

BACKGROUND

In recent years, data is transferred between racks, boards, and inside a board at a higher rate than ever. This increase of the transfer rate depends on significant increases in the performance of a central processing unit (CPU) provided in a high-end server. Therefore, the technology of increasing the rate of data transfer performed with electrical wiring is approaching its limit, and an optical interconnect technology which allows for transferring data at a much higher rate is expected.

For achieving a higher rate optical interconnection, a light-emitting element should also be driven at a higher rate. When the light-emitting element is driven by a rectangular-wave signal, an optical output waveform illustrated in FIG. 1 is obtained, where the rise and fall of the optical output waveforms are asymmetrical. The lateral axis of FIG. 1 represents time and the vertical axis represents signal power. A time slot assigned for one bit of data is illustrated in FIG. 1.

For reducing the asymmetry of the rise and the fall of the waveform of the light-emitting element, for example, a driving circuit being in a semi-driving state outputs, in advance, signals which are smaller than those output from the driving circuit being in a driving state when a state of the display element is changed from the turn-off state to the turn-on state. Further, for changing the state of the display element from the turn-on state to the turn-off state, the driving circuit outputs, in advance, signals which are larger than those output from the driving circuit being in a non-driving state (for example, Japanese Laid-open Patent Publication No. 1-179194).

Further, the method of adjusting the brightness of a light-emitting diode (LED) by adjusting the current flowing through the LED in a step-like manner is disclosed in Japanese Laid-open Patent Publication No. 2009-277514, for example.

An LED driving circuit disclosed in this Patent Document includes a first peaking current generating circuit and a second peaking current generating circuit. After adding a first peaking current supplied from the first peaking current generating circuit to a driving current flowing through an LED, a second peaking current supplied from the second peaking current generating circuit is further added to the driving current flowing through the LED. The above-described method is disclosed in Japanese Laid-open Patent Publication No. 2006-40975, for example.

SUMMARY

According to an aspect of the invention, a driving circuit includes a first delay circuit, a rise-detection circuit, a fall-detection circuit, a first filter, a second filter, and an adder. The first delay circuit delays an input signal. The rise-detection circuit detects a rise of the input signal. The fall-detection circuit detects a fall of the input signal. The first filter gives a first gain-frequency response to an output signal of the rise-detection circuit. The second filter gives a second gain-frequency response to an output signal of the fall-detection circuit. The adder adds an output signal of the first filter and an output signal of the second filter to an output signal of the first delay circuit.

Advantages of the invention will be realized and attained via the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
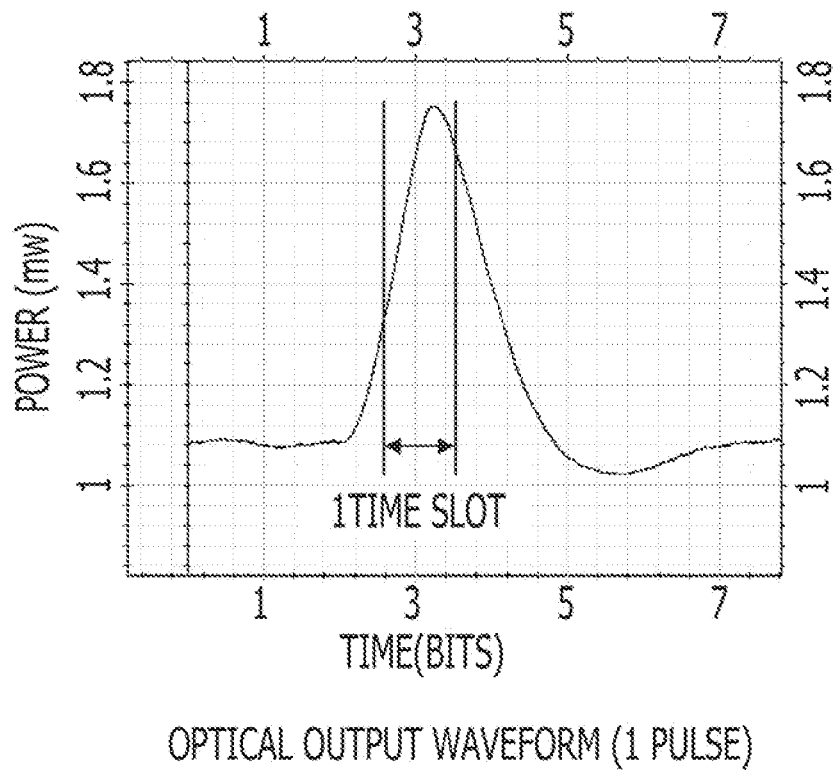
FIG. 1 illustrates a waveform of an optical output from a light-emitting element.
Figure 2:
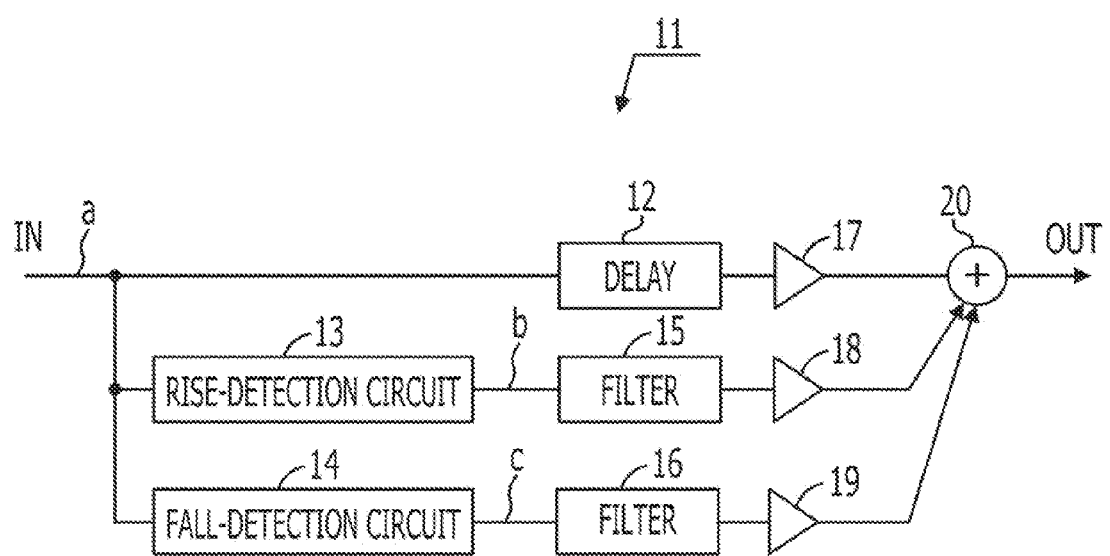
FIG. 2 illustrates an exemplary configuration of a driving circuit according to a first embodiment.

Hereinafter, embodiments of the present invention will be described. FIG. 2 illustrates an exemplary configuration of a driving circuit 11 for driving a light-emitting element according to a first embodiment. Examples of light-emitting element include a semiconductor laser and an LED.

In FIG. 2, a rectangular signal a is input to a delay circuit (Delay) 12, a rise-detection circuit 13, and a fall-detection circuit 14. A signal output from the delay circuit 12 is amplified by an amplifier 17 and is output to an adder 20.

The rise-detection circuit 13 detects a rise of the input signal a and outputs a signal b synchronized with the rise of the input signal a to a filter 15. The filter 15 receives a signal (rise-detection signal) b output from the rise-detection circuit 13 and outputs a signal which is modulated based on a desired frequency response. The desired frequency response at the rising time of a signal may compensate for the gain characteristic of a signal output from the light-emitting element. The output signal of the filter 15 is amplified by an amplifier 18, and is output to the adder 20.

The fall-detection circuit 14 detects a fall of the input signal a, and outputs a signal c synchronized with the fall of the input signal a to a filter 16. The filter 16 receives a signal (fall-detection signal) c output from the fall-detection circuit 14 and outputs a signal which is modulated based on a desired frequency response. The desired frequency response at the falling time of a signal may compensate for the gain characteristic of a signal output from the light-emitting element. The output signal of the filter 16 is amplified by an amplifier 19, and is output to the adder 20. Each of the filters 15 and 16 may be achieved through arithmetic processing performed with a digital filter.

The adder 20 adds signals output from the amplifiers 17, 18, and 19 and outputs the combined signal. That is, the adder 20 outputs a signal by adding; a delayed input signal a; a rising signal, which is synchronized with the input signal a and has a desired frequency response; and a falling signal, which is synchronized with the input signal a and has a desired frequency response.

Here, the rise-detection circuit 13 and the fall-detection circuit 14 may be provided as a single circuit performing the rise detection and the fall detection.

Figure 3:
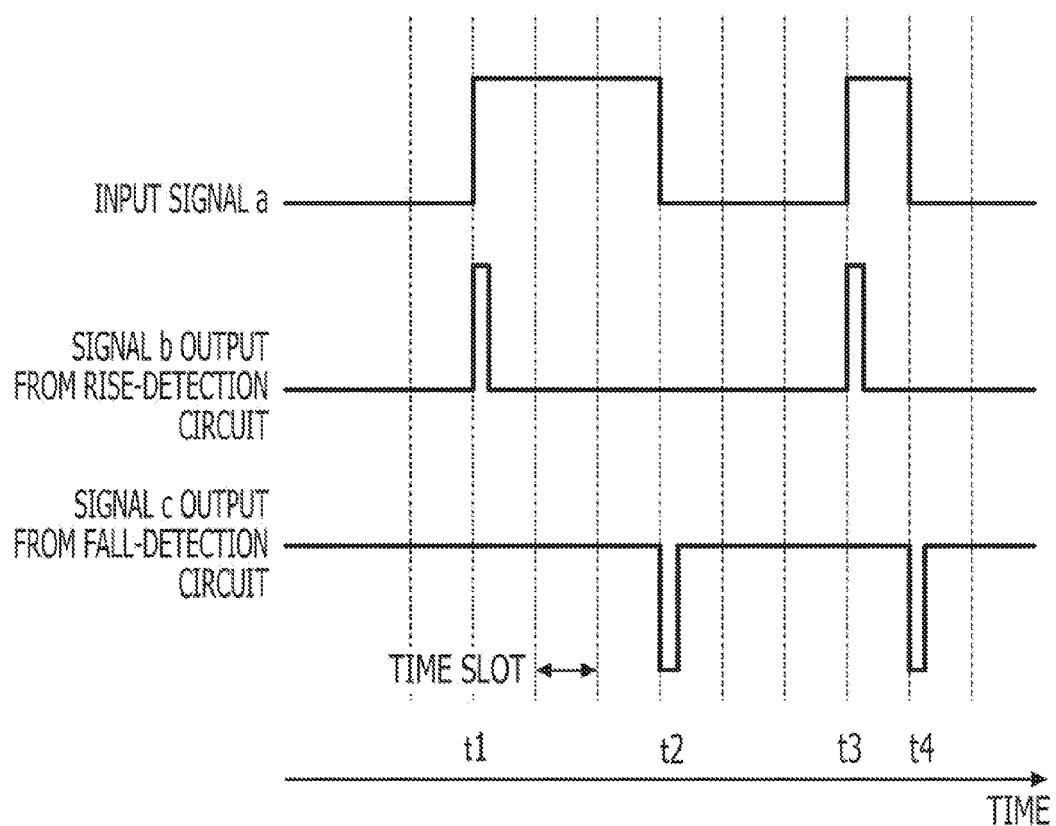
FIG. 3 illustrates an exemplary timing chart of signals in the driving circuit according to the first embodiment.

FIG. 3 is a timing chart of signals in the driving circuit 11 illustrated in FIG. 2. A time slot illustrated in FIG. 3 with dotted lines represents a period during which one bit of data is output.

The input signal is changed from a low level to a high level at time t1, and is changed from the high level to the low level at time t2. Further, the input signal a is changed from the low level to the high level at time t3, and is changed from the high level to the low level at time t4.

The output signal b of the rise-detection circuit 13 is changed from the low level to the high level at a time synchronized with the rise of the input signal a. After keeping the high-level state over a specified time period (a time shorter than that of a time slot), the output signal b is changed to the low level. For example, the output signal b is changed from the low level to the high level at time t2 when the input signal a is changed from the high level to the low level, and is changed to the low level after the lapse of a specified time period since time t1. A time slot is a period corresponding to one bit of a data signal.

The output signal c of the fall-detection circuit 14 is changed from 0 level to a negative level (e.g., −1) at the time synchronized with the fall of the input signal a. After keeping the negative level over a specified time period, the output signal c is returned to the 0 level. For example, the output signal c goes to the negative level at time t2 when the input signal a goes to the low level, and goes to the 0 level after the lapse of a specified time period. Without being limited to a negative signal, the output signal c of the fall-detection circuit 14 may be a positive signal.

Figure 4:
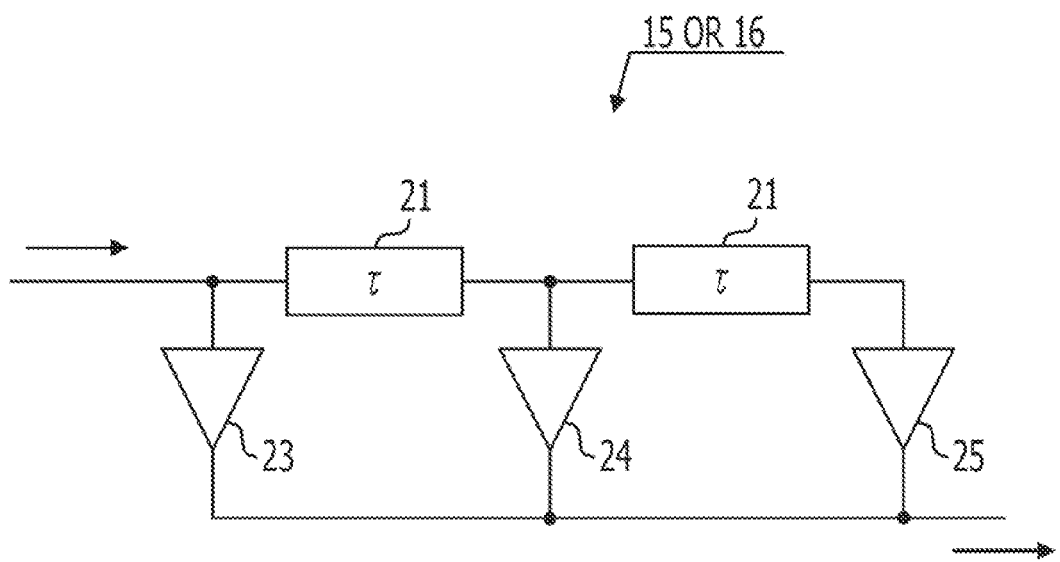
FIG. 4 illustrates an exemplary configuration of a filter.

FIG. 4 illustrates an exemplary configuration of the filter 15 or 16 illustrated in FIG. 2. The filter 15 includes two delay circuits 21 and 22, and three amplifiers 23, 24, and 25.

The signal b output from the rise-detection circuit 13 is input to the delay circuit 21 and the amplifier 23. An output of the delay circuit 21 is input to the delay circuit 22 and the amplifier 24. An output of the delay circuit 22 is input to the amplifier 25. Output signals of the individual amplifiers 23, 24, and 25 are output to the next stage.

A filter having a desired frequency response can be achieved by changing the delay time of each of the above-described delay circuits 21 and 22, and the amplification factor of each of the amplifiers 23 to 25. Then, the output signal b of the rise-detection circuit 13 and the output signal c of the fall-detection circuit 14 are modulated on the basis of desired frequency responses, respectively.

The filters 15 and 16 are not limited to a circuit with two pairs of the delay circuit and amplifier, the pairs are cascade connected as illustrated in FIG. 4. That is, three or more pairs of the delay circuit and amplifier may be cascade connected. Further, the filters 15 and 16 may be a digital filter configured not by the cascade connection but by parallel connection of the pairs of the delay circuit and amplifier. For example, the digital filter includes a parallel finite impulse response (FIR) filter, a parallel infinite impulse response (IIR) filter, and so forth.

Figure 5:
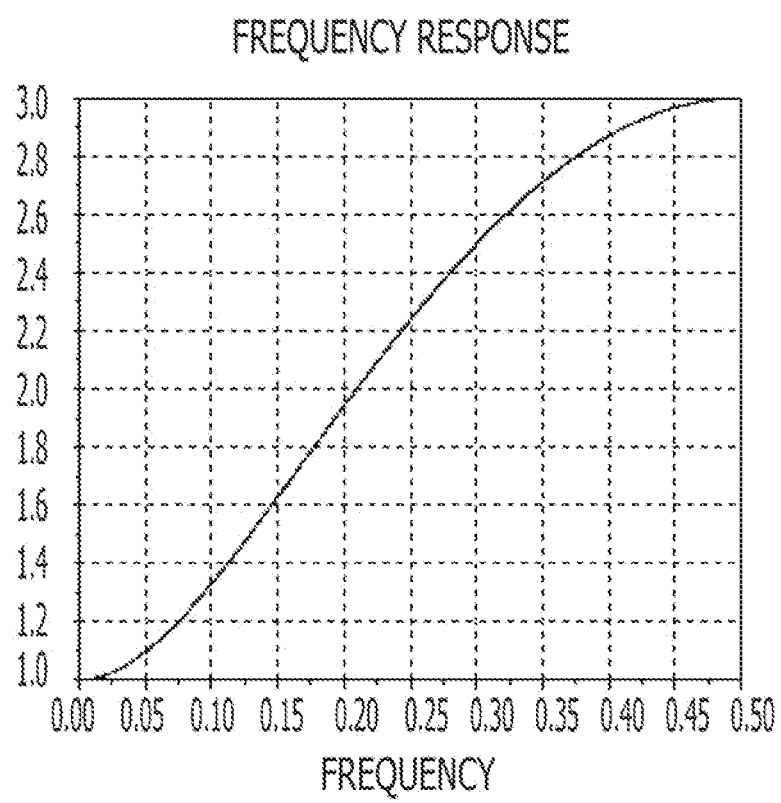
FIG. 5 illustrates an exemplary frequency response of the filter.

FIG. 5 is an exemplary frequency response pattern of the filter illustrated in FIG. 4. The lateral axis of FIG. 5 represents frequency normalized with a specified reference frequency, and the vertical axis represents values calculated by dividing the measured amplitude by the amplitude of the signal measured at the reference frequency.

The frequency response illustrated in FIG. 5 can be achieved by adjusting the delay time and the amplification factor of the filter 15 illustrated in FIG. 4. Consequently, a desired frequency response can be given to the output signal b of the rise-detection circuit 13.

Figure 6:
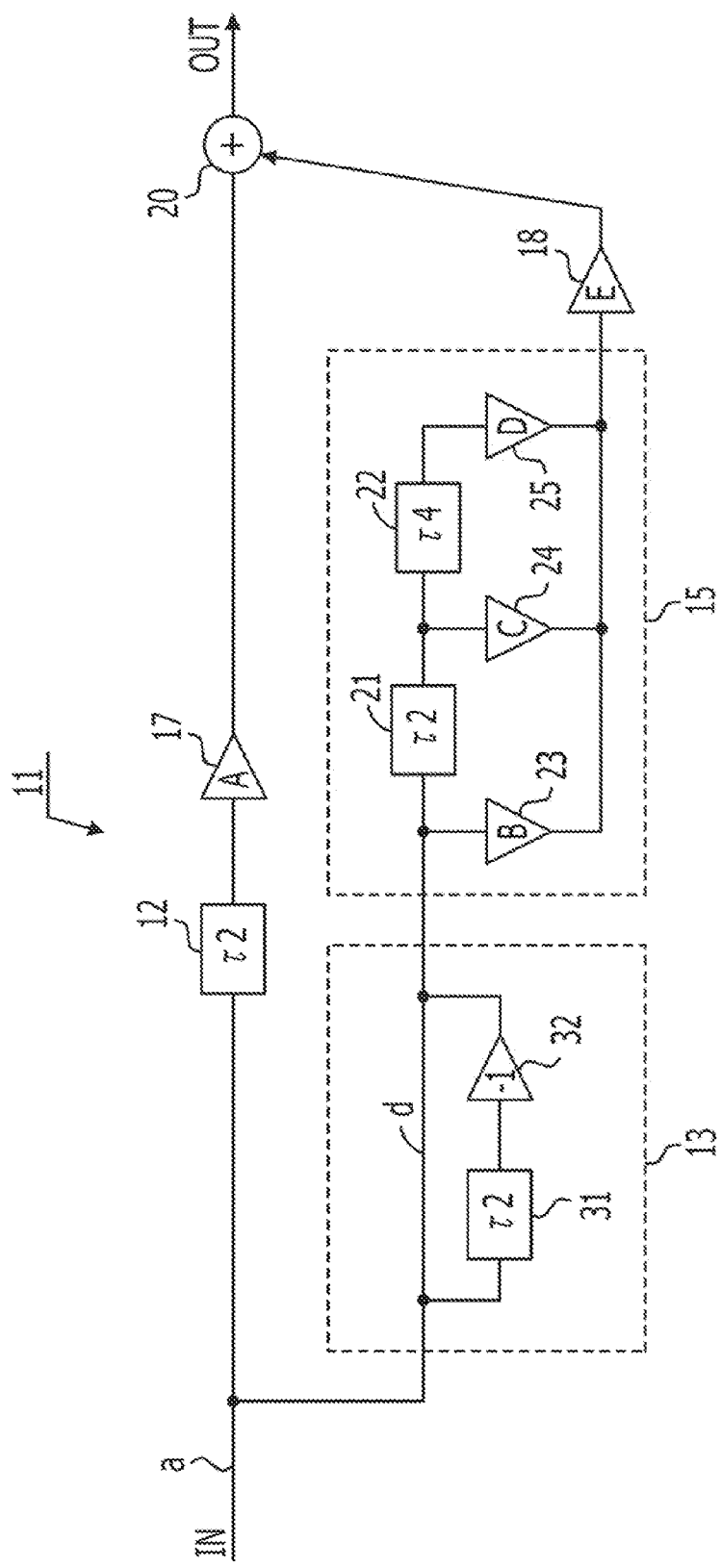
FIG. 6 is an exemplary block diagram illustrating an operation of the driving circuit.

FIG. 6 is an exemplary block diagram illustrating an operation of the driving circuit 11. FIG. 6 illustrates the driving circuit 11 observed at the rise-detection time through the use of transfer functions.

The rise-detection circuit 13 illustrated in FIG. 2 may be expressed as a circuit d which outputs the input signal a as it is, a delay circuit 31 with a delay time $\tau 2$, and an amplifier 32 with an amplification factor −1.

The rise-detection circuit 13 delays the rectangular input signal a by a time $\tau 2$ with the delay circuit 31, and outputs a signal that is a sum of the input signal a and a signal obtained by multiplying the delay signal by −1.

The filter 15 can be represented by an equivalent circuit including a delay circuit 21 with a delay time $\tau 3$, a delay circuit 22 with a delay time $\tau 4$, an amplifier 23 with a factor B, an amplifier 24 with a factor C, and an amplifier 25 with a factor D.

The filter 15 processes a signal output from the rise-detection circuit 13 on the basis of the above-described delay times and amplification factors, and outputs the processed signal. The signal output from the filter 15 is amplified by the amplifier 18 with a factor E, and goes to the adder 20.

The adder 20 outputs a signal that is a sum of the signal output from the amplifier 18 and the signal which is delayed by a time $\tau 1$ and amplified with a factor A. The adder 20 outputs the signal as a driving signal at the rise time.

A transfer function H(f) of the driving circuit 11 in FIG. 6 is expressed as follows:

$$H(f) = Ae^{-j\omega\tau 1} + E(1-e^{-j\omega\tau 2})(B + Ce^{-j\omega\tau 3} + De^{-j\omega(\tau 3+\tau 4)})$$

wherein, $\omega = 2\pi f$

The driving circuit 11 with a desired frequency response can be realized by changing the amplification factors A to D of the respective amplifiers 17 and 23 to 25, and the delay times τ1 to τ4 of the respective delay circuits 12, 31, 21, and 22. For example, when the gain-frequency response of the driving circuit 11 is designed to have a pattern that is reverse to that of the light-emitting element, the gain-frequency response of the entire unit composed of the light-emitting element and the driving circuit 11 may be improved.

When designing the frequency response of the driving circuit 11, not all of the delay times of the delay circuits and the amplification factors of the amplifiers may be changed. For example, the delay time τ2 of the rise-detection circuit 13, and the delay times τ3 and τ4 and the amplification factors B to D of the filter 15 may be designed to compensate for the gain-frequency response of the light-emitting element at a turn-on time. The delay time of the fall-detection circuit 14, and the delay time and the amplification factor of the filter 16 may be designed to compensate for the gain-frequency response of the light-emitting element at a turn-off time.

Figure 7:
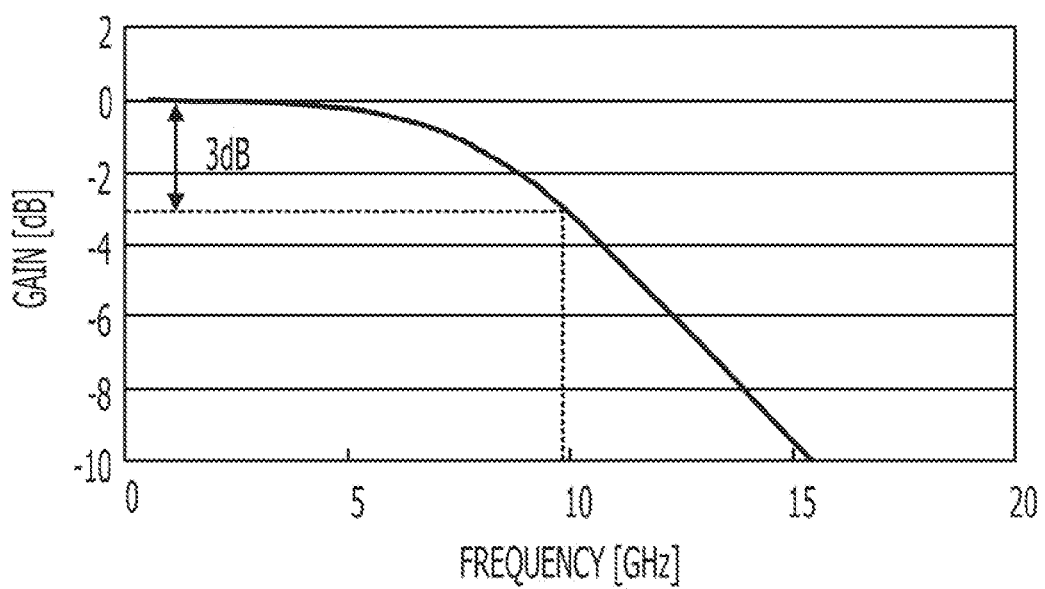
FIG. 7 illustrates an exemplary frequency response at a turn-on time (mark) of the light-emitting element.

FIG. 7 illustrates a gain-frequency response of the light-emitting element at the turn-on time (mark). As indicated in FIG. 7, the light-emitting element has a gain-frequency response that decreases by 3 dB at a frequency of about 10 GHz.

Figure 8:
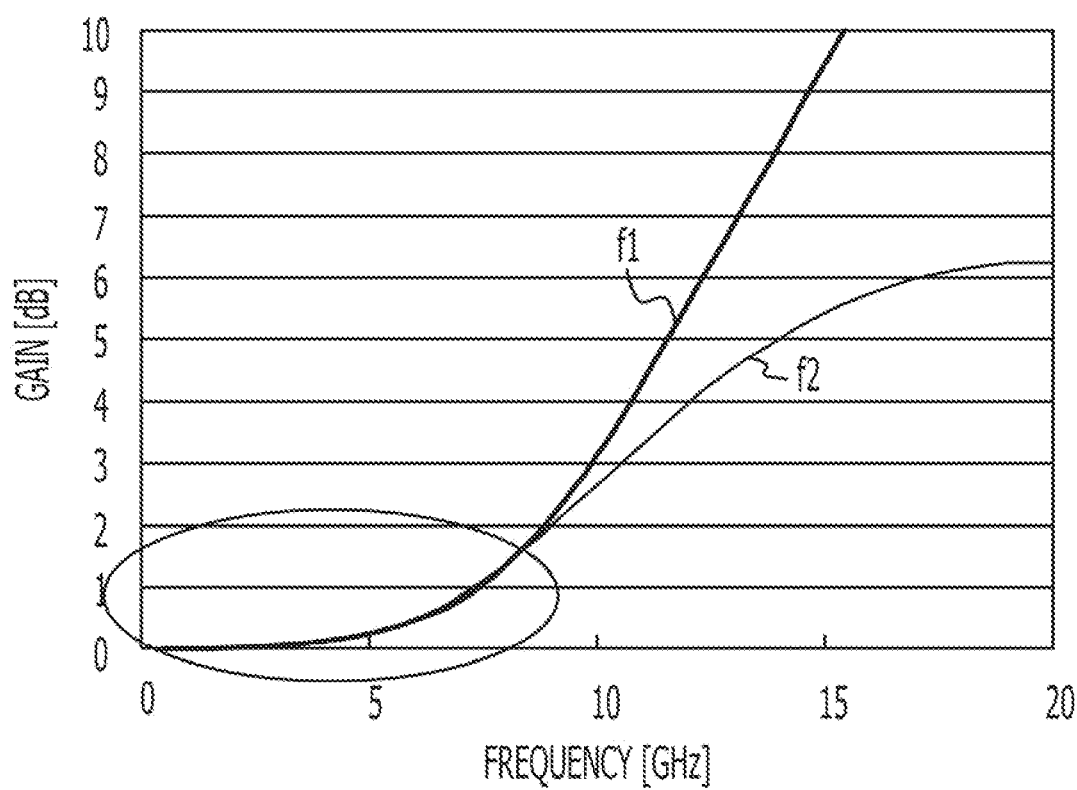
FIG. 8 illustrates an exemplary frequency response at a turn-on time (mark) of the driving circuit.

FIG. 8 illustrates a frequency response in a turn-on time (mark) of the driving circuit 11. A curve f1 in FIG. 8 is a gain-frequency response curve which is drawn based on the gain-frequency response curve of the light-emitting element illustrated in FIG. 7. That is, the curve f1 in FIG. 8 may fall along the gain-frequency response curve of the light-emitting element in FIG. 7 when the curve in FIG. 7 is inverted with respect to a frequency axis passing through 0 dB.

A curve f2 in FIG. 8 is the gain-frequency response curve of the driving circuit 11. The curve f2 falls on the curve f1 in the range (a circled part illustrated in FIG. 8) from 0 GHz to a frequency at which a gain is about 2 dB (that is, about 8 GHz). A gain-frequency response with the above-described characteristics may be realized by designing that of the driving circuit 11 so that the designed response curve falls on the response curve of the light-emitting element, which is obtained by inversing the curve of the gain-frequency response of the light-emitting element with respect to the frequency axis. For example, the gain-frequency response with the above-described characteristics may be realized by designing the value of the delay times τ1 to τ4 and the amplification factors A to D of the delay circuit 11 in FIG. 6.

At a frequency of about 8 GHz or higher, as illustrated in FIG. 8, the gain of the curve f2 (the gain of the driving circuit 11) is lower than that of the curve f1 (the gain of the light-emitting element, which is inverted with respect to the frequency axis).

Therefore, the gain of the entire circuit including the light-emitting element and the driving circuit 11 can be roughly leveled from 0 GHz to the proximity of 8 GHz by designing the delay time and the amplification factor of the driving circuit 11 to have the gain-frequency response illustrated with the curve f2 of FIG. 8. That is, the frequency at which the gain of the light-emitting element, the gain being illustrated in FIG. 7, becomes 0 dB is extended to the proximity of 8 GHz. Accordingly, the frequency bandwidth can be extended by increasing a cut-off frequency (a frequency at which the gain is decreased by 3 dB) obtained on the high-pass side of the gain-frequency response of the entire circuit including the light-emitting element and the driving circuit 11.

Figure 9:
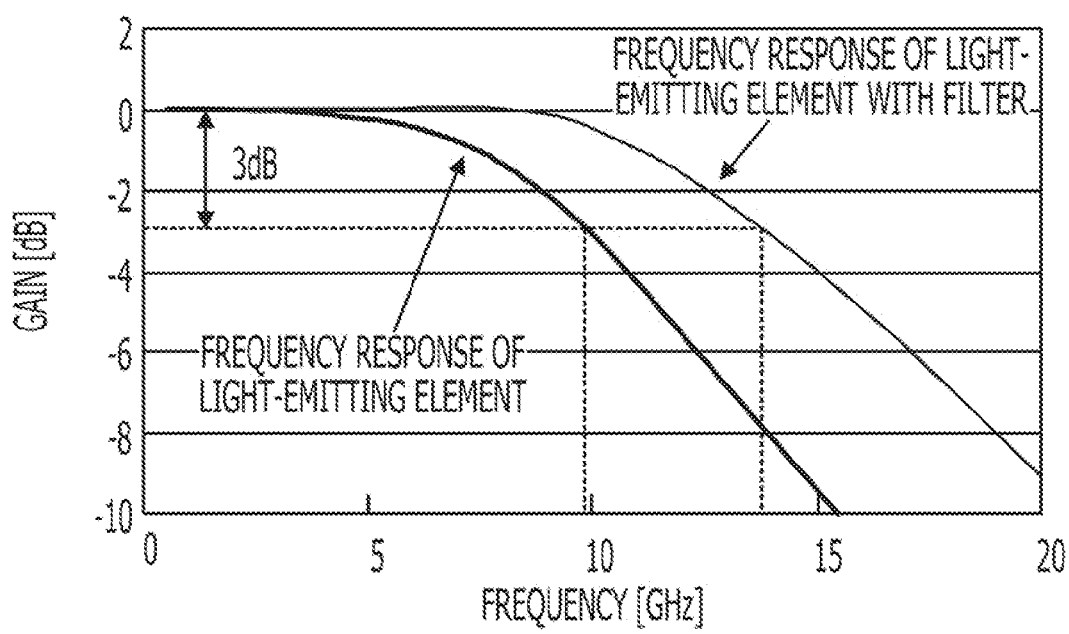
FIG. 9 illustrates an exemplary frequency response at a turn-on time (mark) of the entire circuit including the light-emitting element and the driving circuit.

FIG. 9 illustrates the gain-frequency response of the entire circuit including the light-emitting element and the driving circuit 11, the gain-frequency response at the turn-on time (mark). The light-emitting element according to the first embodiment has such a characteristic that the gain is decreased by 3 dB in the proximity of 10 GHz at the turn-on time as illustrated in FIG. 9.

The frequency response of the driving circuit 11 including the rise-detection circuit 13, the filter 15 is designed to have the frequency response illustrated in FIG. 8 so that the gain of the entire circuit including the light-emitting element and the driving circuit 11 becomes 0 dB until the proximity of 10 GHz (see FIG. 9).

Comparing the frequency response of the light-emitting element, which is illustrated in FIG. 9, and the frequency response of the entire circuit including the light-emitting element and the driving circuit 11, the cut-off frequency at which the gain is decreased by 3 dB of the light-emitting element is different from that of the entire circuit. That is, when the cut-off frequency of the light-emitting element is approximately 10 GHz, the cut-off frequency of the entire circuit (including the light-emitting element and the driving circuit 11) including the filters is approximately 14 GHz. The rise-detection circuit 13 and the filter 15 are provided in the driving circuit 11, and the frequency response of the driving circuit 11 is designed to compensate for that of the light-emitting element. Consequently, it becomes possible to extend the frequency bandwidth of the gain of the entire circuit including the light-emitting element and the driving circuit 11.

Figure 10:
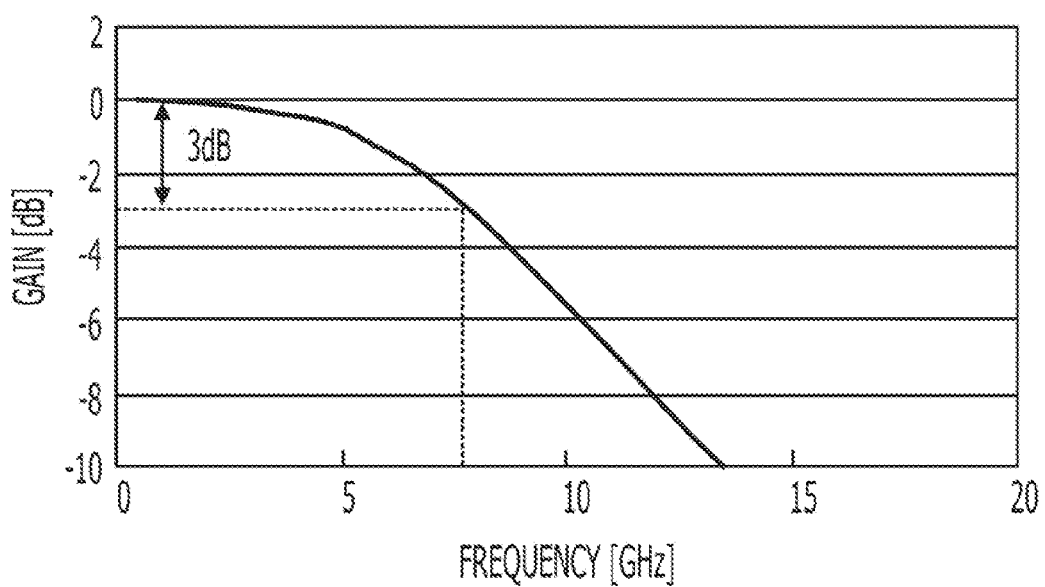
FIG. 10 illustrates an exemplary frequency response in a turn-off time (space) of the light-emitting element.

Next, FIG. 10 illustrates a frequency response of the light-emitting element, the frequency response being attained when the light-emitting element is turned off (space).

According to a gain-frequency response illustrated in FIG. 10, the light-emitting element has such a frequency response that the gain is decreased by 3 dB in the proximity of 8 GHz at the turn-off time. According to the light-emitting element, the cut-off frequency obtained on the high-pass side, at which the gain is decreased by 3 dB, is in the proximity of 8 GHz. When the light-emitting element is turned off (space), either the state where no data signal is transmitted while a fixed driving current is allowed to pass through the light-emitting element or the state where the value of a driving current is 0 and a data signal is transmitted may occur.

Figure 11:
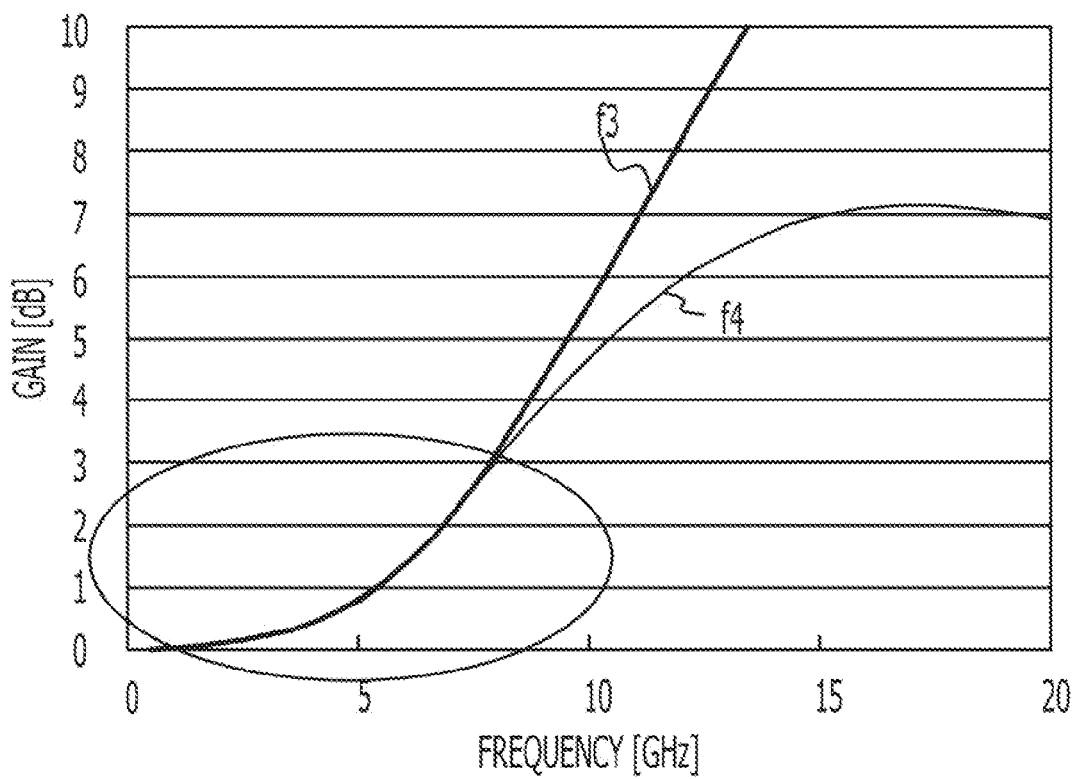
FIG. 11 illustrates an exemplary frequency response in a turn-off time (space) of the driving circuit.

FIG. 11 illustrates a frequency response of the driving circuit 11, which is attained at the turn-off time. A curve f3 illustrated in FIG. 11 illustrates a response attained by reflecting the gain-frequency response of the light-emitting element, the gain-frequency response being illustrated in FIG. 10, about a frequency axis passing through 0 dB.

A curve f4 illustrated in FIG. 11 illustrates a gain-frequency response of the driving circuit 11. The gain of the curve f4 falls on that of the curve f3 (a circled part illustrated in FIG. 11) from 0 GHz to a frequency at which a gain of 3 dB is attained (the proximity of 8 GHz in FIG. 11). The gain adjustment can be achieved by designing the gain-frequency response of the driving circuit 11 including the fall-detection circuit 14 and the filter 16 in such a manner that the designed gain-frequency response falls on the frequency response of the light-emitting element, the frequency response being reflected about the frequency axis. More specifically, the gain adjustment is achieved by designing the value of each of the delay time of the delay circuit of the fall-detection circuit 14, the delay times of the two delay circuits of the filter 16, and the amplification factors of the three amplifiers to compensate the gain-frequency response of the light-emitting element.

At a frequency of about 8 GHz or higher illustrated in FIG. 11, the gain of the curve f4 (the gain of the driving circuit 11)

is lower than that of the curve f3 (the gain of the light-emitting element, the gain being reflected about the frequency axis).

Therefore, the gain-frequency response of the entire circuit including the light-emitting element and the driving circuit 11 can be roughly leveled from 0 GHz to the proximity of 8 GHz by designing the delay time and the amplification factor of the driving circuit 11 to achieve the frequency response illustrated by the curve f4 of FIG. 11. Further, according to the frequency response, the gain is decreased with a fixed inclination at a frequency of 8 GHz or higher.

Figure 12:
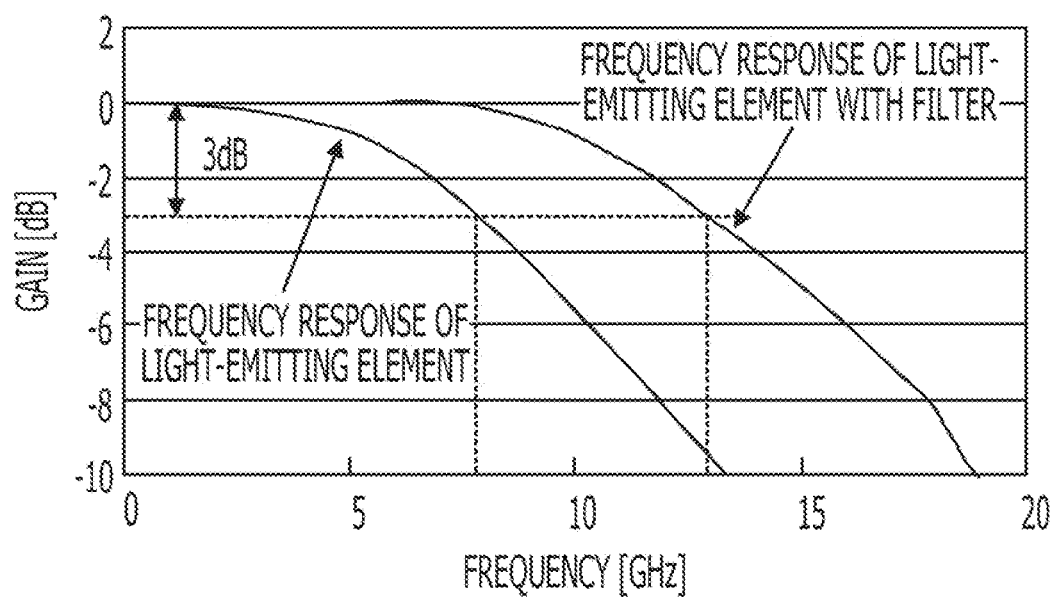
FIG. 12 illustrates an exemplary frequency response in a turn-off time (space) of the entire circuit including the light-emitting element and the driving circuit.

FIG. 12 illustrates the gain-frequency response of the entire circuit including the light-emitting element and the driving circuit 11, the gain-frequency response being attained at the turn-off time (space).

The gain of the light-emitting element is decreased by 3 dB in the frequency range of from 0 GHz to about 8 GHz as illustrated in FIG. 12, and the value of the cut-off frequency at which the gain is decreased by 3 dB is approximately 8 GHz.

On the other hand, the frequency response of the driving circuit 11 including the fall-detection circuit 14 and the filter 16 falls on that of the light-emitting element, which is reflected about the frequency axis, in the frequency range of from 0 GHz to approximately 8 GHz. Consequently, the gain of the entire circuit including the light-emitting element and the driving circuit 11 becomes almost constant in the frequency range of from 0 GHz to approximately 8 GHz. At a frequency of 8 GHz or higher, the gain is gradually decreased so that the gain is decreased by 3 dB at a frequency of approximately 13 GHz. That is, the value of the cut-off frequency obtained on the high-pass side of the entire circuit including the light-emitting element and the driving circuit 11 is approximately 13 GHz.

The bandwidth of the gain of the entire circuit including the light-emitting element and the driving circuit 11, the gain being attained at the turn-off time, can be extended by making the gain-frequency response of the driving circuit 11, the gain at the turn-off time, falls on the frequency response of the light-emitting element, the frequency response being reflected about the frequency axis, in a fixed frequency range. More specifically, the frequency bandwidth of the gain of the entire circuit including the light-emitting element and the driving circuit 11 can be extended by determining the value of each of the delay times of the fall-detection circuit 14 and the delay circuits of the filter 16, and the amplification factors of the amplifiers to compensate for a decrease in the gain of the light-emitting element, where the fall-detection circuit 14, the filter 16, and the amplifiers are provided in the driving circuit 11.

Figure 13A:
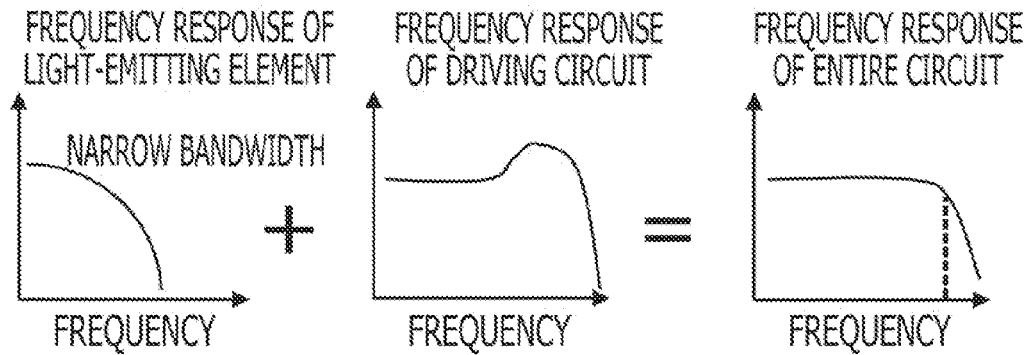
FIG. 13A illustrates an exemplary frequency response in a turn-off time (space) of a light-emitting element, a driving circuit, and the entire circuit.
Figure 13B:
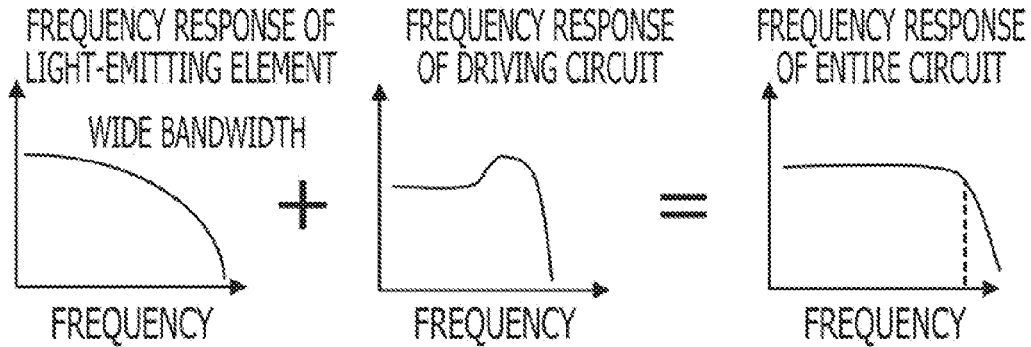
FIG. 13B illustrates an exemplary frequency response at a turn-on time (mark) of the light-emitting element, the driving circuit, and the entire circuit.

Each of FIGS. 13A and 13B illustrates the bandwidth of each of the light-emitting element, the driving circuit 11, and the entire circuit. First, a bandwidth attained at the turn-off time (space (0)) will be described. The cut-off frequency of the light-emitting element, the cut-off frequency being attained at the turn-off time, is approximately 8 GHz (see FIG. 7), and the bandwidth of the gain of the light-emitting element, the gain being obtained at the turn-off time, is smaller than that obtained at the turn-on time (mark). The gain-frequency response of the driving circuit 11 is set to a response determined to compensate for a decrease in the gain of the light-emitting element.

Therefore, the cut-off frequency of the entire circuit including the light-emitting element and the driving circuit 11 is extended to approximately 13 GHz (see FIG. 12), and the bandwidth of the gain of the entire circuit including the light-emitting element and the driving circuit 11 is extended as illustrated in FIG. 13A.

At the turn-on time (mark (1)), the cut-off frequency of the light-emitting element is approximately 10 GHz (see FIG. 7), and the bandwidth of the gain of the light-emitting element is larger than that obtained at the turn-off time as illustrated in FIG. 13B. The gain-frequency response of the driving circuit 11 is set to a response provided to compensate for a decrease in the gain of the light-emitting element.

Therefore, the cut-off frequency of the entire circuit including the light-emitting element and the driving circuit 11, the cut-off frequency being obtained at the turn-on time, is extended to approximately 13 GHz (see FIG. 9), and the bandwidth of the gain of the entire circuit including the light-emitting element and the driving circuit 11 is extended as illustrated in FIG. 13B.

Figure 14A:
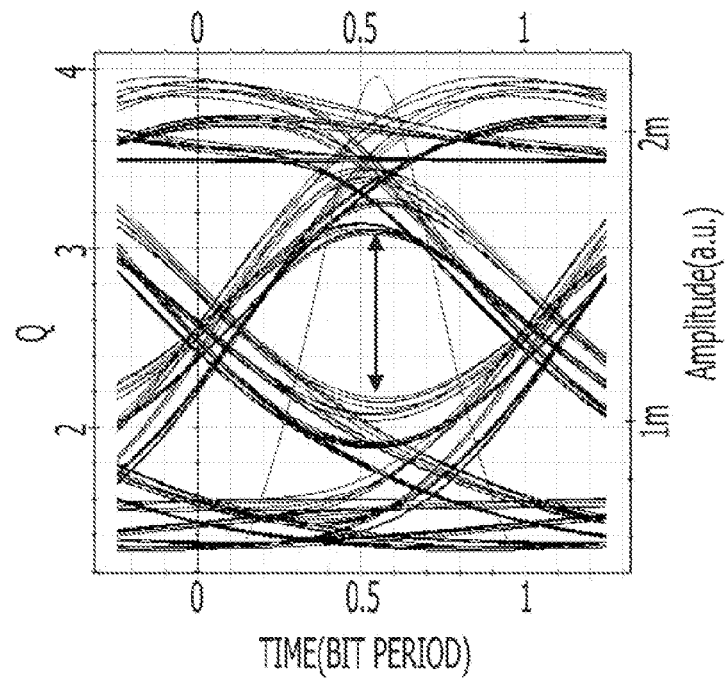
FIG. 14A illustrates an exemplary eye-pattern of an optical signal.
Figure 14B:
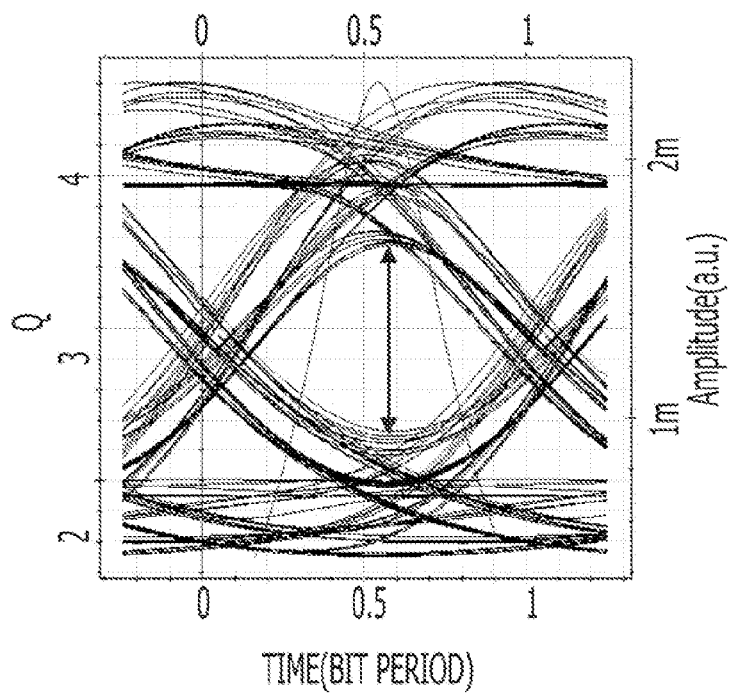
FIG. 14B illustrates an exemplary eye-pattern of another optical signal.

Each of FIGS. 14A and 14B illustrates an eye-pattern of an optical signal of the light-emitting element. FIG. 14A illustrates an eye-pattern of the optical signal, the eye-pattern being achieved through the use of a known driving circuit, and FIG. 14B illustrates an eye-pattern of the optical signal, the eye-pattern being achieved through the use of the driving circuit 11 of the first embodiment.

In FIG. 14B, the aperture (the height in a vertical direction) of the eye-pattern of the optical signal obtained through the use of the driving circuit 11 of the first embodiment is about 1.3 times larger than that of the eye-pattern of the optical signal obtained through the use of the known driving circuit, the eye-pattern being illustrated in FIG. 14A. An increase in the aperture of the eye-pattern means that the signal quality of the optical signal is increased due to the fact that the frequency bandwidth of the gain of the entire circuit including the light-emitting element and the driving circuit 11 is increased through the use of the driving circuit 11 according to the first embodiment.

The above-described first embodiment allows for increasing the frequency bandwidth of the gain of the entire circuit including the light-emitting element and the driving circuit 11. Consequently, the distortion of the waveform of the optical signal is decreased and the aperture of the eye-pattern is increased. Further, the symmetry of a waveform of the optical signal, the waveform being obtained at the rise time, and another waveform of the optical signal, the waveform being obtained at the fall time, can be increased by bringing the outspread of the bandwidth of a gain obtained when the light-emitting element is turned on near to that of the bandwidth of a gain obtained when the light-emitting element is turned off. The distortion of the waveform of the optical signal can be reduced by increasing the symmetry of the waveforms.

Figure 15:
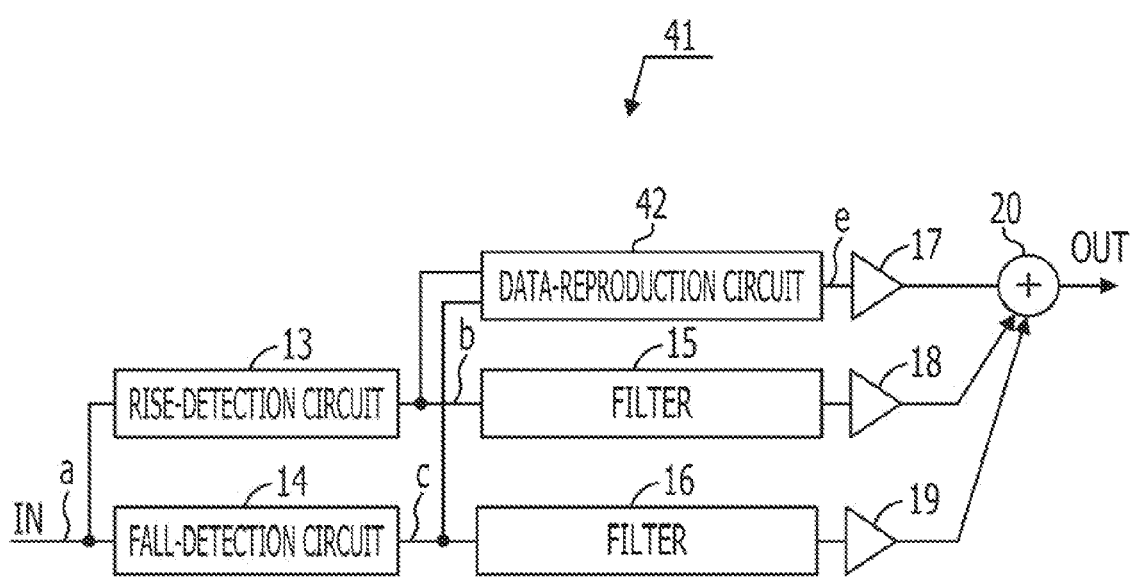
FIG. 15 illustrates an exemplary circuit configuration of a driving circuit according to a second embodiment.

FIG. 15 illustrates an exemplary configuration of a driving circuit 41 according to a second embodiment. In FIG. 15, the same circuits as those of FIG. 2 are designated by the same reference numerals and the descriptions thereof are omitted.

The driving circuit 41 includes the rise-detection circuit 13, the fall-detection circuit 14, a data-reproduction circuit 42, the filters 15 and 16, the amplifiers 17 to 19, and the adder 20.

The output signal b of the rise-detection circuit 13 and the output signal c of the fall-detection circuit 14 are input to the data-reproduction circuit 42. An output of the data-reproduction circuit 42 attains a high level based on the output signal b and is changed to a low level based on the output signal c. The output signal b is synchronized with the rise of the input signal a and the output signal C is synchronized with the fall of the input signal a. Therefore, an output signal e of the data-reproduction circuit is equivalent to the input signal a. Other circuit configurations are the same as those illustrated in FIG. 2.

Figure 16:
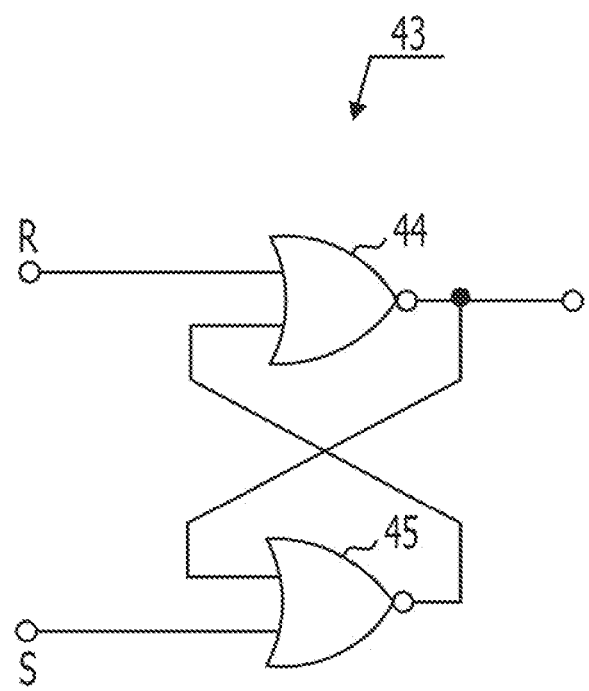
FIG. 16 illustrates a circuit diagram of an RS flip-flop.

FIG. 16 is a circuit diagram of an RS flip-flop 43 provided as an example of the data-reproduction circuit 42.

The RS flip-flop 43 includes two NOR gates 44 and 45. A signal obtained by inverting the polarity of the output signal c of the fall-detection circuit 14 is input to one of input terminals (a reset terminal R) of the NOR gate 44, and an output of the NOR gate 45 is input to the other input terminal.

The output signal b of the rise-detection circuit 13 is input to one of input terminals (a set terminal S) of the NOR gate 45, and an output signal of the NOR gate 44 is input to the other input terminal.

When the signal input to the set terminal S of the NOR gate 45 is changed from a low level to a high level, the output signal of the NOR gate 44 is changed from the low level to the high level. Although the output signal b is changed to the low level in that state, the output signal of the NOR gate 44 is maintained at the high level.

Next, when the value of the output signal c of the fall-detection circuit 14 becomes negative and a signal provided to determine the polarity of the value is changed from the low level to the high level, the output signal of the NOR gate 44 is changed from the high level to the low level.

That is, the output signal of the NOR gate 44 is changed from the low level to the high level at a time synchronized with the rise of the input signal a, and is changed to the low level at a time synchronized with the fall of the input signal a. Therefore, an output signal of the RS flip-flop 43 becomes equivalent to the input signal a.

Without being limited to the RS flip-flop 43, the data-reproduction circuit 42 may be any circuit so long as the circuit can reproduce substantially the same signal as the input signal a based on the output signal b of the rise-detection circuit 13 and the output signal c of the fall-detection circuit 14.

The above-described second embodiment allows for extending the bandwidth of the gain of the entire circuit including the light-emitting element and the driving circuit 41 as is the case with the first embodiment. Consequently, it becomes possible to reduce the distortion of the waveform of an optical signal and increase the signal quality of an optical signal. Further, an input signal can be reproduced with the data-reproduction circuit 42 without using the delay circuits.

Figure 17:
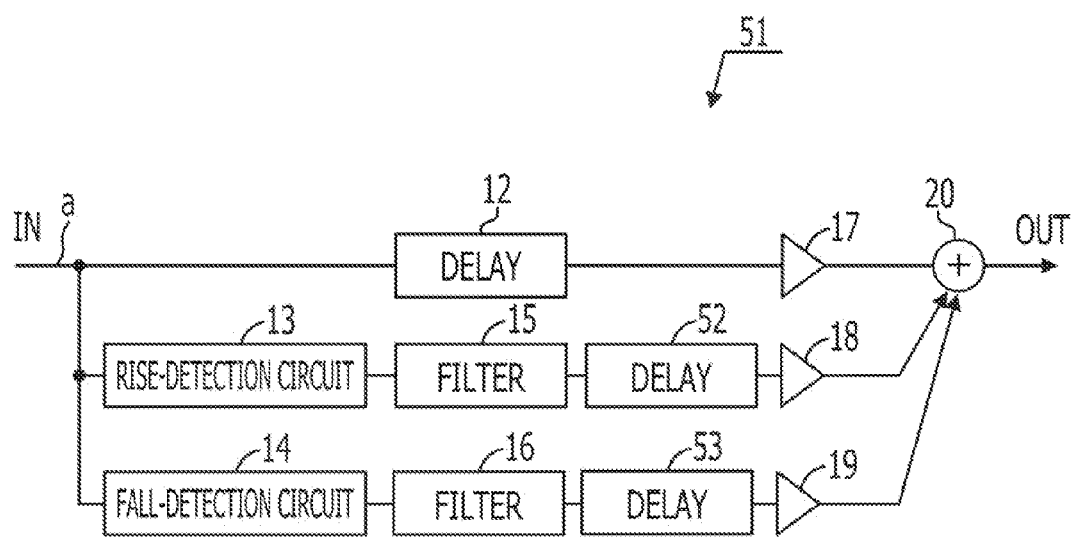
FIG. 17 illustrates an exemplary circuit configuration of a driving circuit according to a third embodiment.

Next, FIG. 17 illustrates an exemplary circuit configuration of a driving circuit 51 according to a third embodiment. In FIG. 17, the same blocks as those of FIG. 2 are designated by the same reference numerals and the descriptions thereof are omitted.

A delay circuit 52 is provided between the output of the filter 15 and the input of the amplifier 18. Likewise, a delay circuit 53 is provided between the output of the filter 16 and the input of the amplifier 19.

The delay circuit 52 is a circuit provided to adjust a delay occurring in each of the rise-detection circuit 13 and the filter 15.

The delay circuit 53 is a circuit provided to adjust a delay occurring in each of the fall-detection circuit 14 and the filter 16.

The above-described third embodiment allows for extending the bandwidth of the gain of the entire circuit including the light-emitting element and the driving circuit 11, as is the case with the first embodiment. Consequently, the distortion of the waveform of an optical signal is decreased and the signal quality of an optical signal is increased. Further, the delay of a signal of the system of the rise-detection circuit 13 and that of a signal of the system of the fall-detection circuit 14 can be adjusted with the individual delay circuits 52 and 53.

The disclosed driving circuits allow for increasing the signal quality of light output from the light-emitting element.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the invention have been described in detail, it should be understood that the various changes, substitutions, and alterations could be made hereto without departing from the spirit and scope of the invention.

What is claimed is:

1. A driving circuit comprising:
a first delay circuit configured to delay an input signal;
a rise-detection circuit configured to detect a rise of the input signal;
a fall-detection circuit configured to detect a fall of the input signal;
a first filter configured to give a first gain-frequency response to an output signal of the rise-detection circuit;
a second filter configured to give a second gain-frequency response to an output signal of the fall-detection circuit; and
an adder configured to add an output signal of the first filter and an output signal of the second filter to an output signal of the first delay circuit.

2. The driving circuit according to claim 1, wherein
the input signal is used to drive a light-emitting element,
the first filter has the first gain-frequency response which is a reverse of a gain-frequency response of the light-emitting element at a turn-on time of the light-emitting element, and
the second filter has the second gain-frequency response which is the reverse of the gain-frequency response of the light-emitting element at a turn-off time of the light-emitting element.

3. The driving circuit according to claim 1, wherein
each of the first and second filters includes a plurality of delay circuits configured to delay the input signal and a plurality of amplifiers.

4. The driving circuit according to claim 1, further comprising:
a first amplifier configured to amplify the output signal of the first delay circuit;
a second amplifier configured to amplify the output signal of the first filter; and
a third amplifier configured to amplify the output signal of the second filter, wherein
the adder adds the output signal amplified by the second amplifier and the output signal amplified by the third amplifier to the output signal amplified by the first amplifier.

5. The driving circuit according to claim 1, further comprising:
a second delay circuit configured to adjust a signal delay occurring in the rise-detection circuit and the first filter; and
a third delay circuit configured to adjust a signal delay occurring in the fall-detection circuit and the second filter.

6. A driving circuit comprising:
a rise-detection circuit configured to detect a rise of an input signal;
a fall-detection circuit configured to detect a fall of the input signal;

a first filter configured to give a first gain-frequency response to an output signal of the rise-detection circuit;

a second filter configured to give a second gain-frequency response to an output signal of the fall-detection circuit;

a data-reproduction circuit configured to reproduce the input signal based on the output signal of the rise-detection circuit and the output signal of the fall-detection circuit; and an adder configured to add an output signal of the first filter and an output signal of the second filter to an output signal of the data-reproduction circuit.

7. The driving circuit according to claim 6, wherein the input signal is used to drive a light-emitting element, the first filter has the first gain-frequency response which is a reverse of a gain-frequency response of the light-emitting element at a turn-on time of the light-emitting element, and the second filter has the second gain-frequency response which is the reverse of the gain-frequency response of the light-emitting element at a turn-off time of the light-emitting element.

8. The driving circuit according to claim 6, wherein each of the first and second filters includes a plurality of delay circuits configured to delay the input signal and a plurality of amplifiers.

9. The driving circuit according to claim 6, further comprising:

a first amplifier configured to amplify the output signal of the data-reproduction circuit;

a second amplifier configured to amplify the output signal of the first filter; and a third amplifier configured to amplify the output signal of the second filter, wherein the adder adds the output signal amplified by the second amplifier and the output signal amplified by the third amplifier to the output signal amplified by the first amplifier.

10. A method of generating a driving signal, the method comprising:

delaying an input signal by a desired time to output a first signal;

giving a first gain-frequency response to a rise-detection signal synchronized with a rise of the input signal to output a second signal;

giving a second gain-frequency response to a fall-detection signal synchronized with a fall of the input signal to output a third signal; and generating a driving signal by adding the second signal and the third signal to the first signal.

11. The method according to claim 10, wherein the input signal is used to drive a light-emitting element, the first gain-frequency response is a reverse of a gain-frequency response of the light-emitting element at a turn-on time of the light-emitting element, and the second gain-frequency response which is the reverse of the gain-frequency response of the light-emitting element at a turn-off time of the light-emitting element.

12. The method according to claim 10, wherein each of giving a first gain-frequency response to a rise-detection signal and giving a second gain-frequency response to a fall-detection signal includes a plurality of delaying the signal and a plurality of amplifying the signal with a desired amplification factor.

13. The method according to claim 10, further comprising:

amplifying the first signal;

amplifying the second signal; and amplifying the third signal, wherein the driving signal is obtained by adding a signal obtained by amplifying the second signal and a signal obtained by amplifying the third signal to a signal obtained by amplifying the first signal.

* * * * *